United States Patent [19]

Hara

[11] 4,229,973
[45] Oct. 28, 1980

[54] DEVICE FOR BRAKING FLOAT MOTION IN FLOAT-TYPE LIQUID LEVEL GAUGE

[75] Inventor: Kunio Hara, Kawasaki, Japan
[73] Assignee: Nifco, Inc., Yokohama, Japan
[21] Appl. No.: 23,068
[22] Filed: Mar. 23, 1979

[30] Foreign Application Priority Data

Mar. 29, 1978 [JP] Japan .......................... 53/39297[U]

[51] Int. Cl.³ ............................................. G01F 23/10
[52] U.S. Cl. ..................................................... 73/317
[58] Field of Search ...................... 73/315, 322.5, 305, 73/317, 319, 430

[56] References Cited

FOREIGN PATENT DOCUMENTS 27970  6/1924 France ................................... 73/317
506247  5/1939 United Kingdom ..................... 73/317

Primary Examiner—Gerald Goldberg
Assistant Examiner—Joseph W. Roskos
Attorney, Agent, or Firm—Jack R. Halvorsen; Robert W. Beart

[57] ABSTRACT

A device for braking the motion of the float of a float type liquid-level gauge used with a liquid container, comprising a casing, a vane member disposed in the casing in such a manner as to produce a motion relative to the casing, a fluid placed to fill the inner space of the casing now containing the vane member and retaining an extra space for permitting the relative motion of the vane member, and a path formed in the casing to permit flow of the fluid inside the inner space of the casing during the aforementioned relative motion of the vane member inside the casing. In actual use, the casing is fixed in position and the vane member is connected with a member adapted to move in conjunction with the float of the float type liquid-level gauge. When a sudden, momentary displacement occurs in the liquid level in the liquid container with which the liquid-level gauge is used, the float kept on the liquid surface by buoyant force tends to follow the displacement. Since the float is connected with the vane member, any motion of the float in excess of a prescribed level is braked by the resistance offered by the fluid during its flow through the path in the casing. Thus, otherwise possible erroneous detection of the liquid level by the liquid-level gauge is prevented.

4 Claims, 16 Drawing Figures

DEVICE FOR BRAKING FLOAT MOTION IN FLOAT-TYPE LIQUID LEVEL GAUGE

BACKGROUND OF THE INVENTION

This invention relates to a device for braking the motion of a float in a float-type liquid-level gauge. More particularly, this invention relates to a device for braking the vertical motion of a float in a float-type liquid-level gauge used for the measurement of the amount of fuel contained in the fuel tank of a vehicle etc., especially a float-operated liquid-level gauge in which the float is supported on the surface of the fuel and the position thereof is converted into a corresponding electric resistance by a variable resistor. The device applies a suitable braking force to the vertical motion of the float and thereby prevents the float from vibrating when jarred externally and inhibits the float from immediately following the displacement of the liquid level when the fuel surface inclines for some reason.

The mechanisms used in most conventional float-type liquid-level gauges are highly sensitive and, in particular, the float mechanism is designed to quickly follow vertical displacements in the liquid level so as to allow the liquid-level gauge to accurately and quickly following changes in the liquid level. Generally when such systems of measurement are discussed purely from the theoretical point of view, it is only natural that emphasis should be placed on pursuit of improvements in operational sensitivity of such mechanisms. When detection elements of very high operational sensitivity are used in liquid-level gauges for indicating the amount of fuel in the tank of a vehicle ect., however, disadvantages almost always arise from the practical point of view. When the vehicle makes a sudden start, sudden stop or sharp curve or when it passes over a bump in the road surface, for example, the shock or force consequently acting on the vehicle causes a displacement in the level of fuel in the fuel tank. In spite of there have been no change in the amount of the fuel in the tank, the float of the gauge faithfully follows the displacement in the fuel level, with the result that the gauge indicates a change, though momentarily.

An object of this invention is to provide a device for applying a suitable braking force to the motion of the float in the float-type liquid-level gauge for thereby preventing the float from following sudden, momentary displacements in the liquid level.

SUMMARY OF THE INVENTION

To accomplish the object described above according to the present invention, there is provided a device for braking the motion of a float in a float-type liquid-level gauge, which device comprises a first member provided internally with a tightly closed chamber and a second member contained in the tightly closed chamber in such a way as to be capable of moving relative to the first member, the tightly closed chamber of the first member possessing, in addition to the space for containing the second member, a vacant space for permitting the relative motion of the second member, the vacant space being filled with a fluid, the tightly closed chamber being provided therein with a fluid path for permitting flow of the fluid when a relative motion of a velocity smaller than the prescribed level is generated between the first and second members, either of the first and second members being stationarily fixed in position and the other of the two members being connected to a member which is moved in conjunction with the float of the liquid-level gauge.

In the braking device of the construction described above, when a sudden change occurs in the liquid level on which the float is kept in position by buoyant force, the float tends to follow that sudden change in the liquid level. Since the float is connected to the first (or second) member and the fluid is prohibited from following any motion of a velocity greater than the prescribed level, a braking force is automatically applied to the motion of the float. Thus, the float is not allowed to follow immediately any sudden, momentary change in the liquid level. Consequently, the liquid-level gauge is prevented from registering on its scale any erroneous indication ascribable to such sudden change in the liquid level.

The other objects and characteristic features of the present invention will become apparent from a detailed description of the invention given hereinafter with reference to the accompanying drawing.

DESCRIPTION OF THE PREFERRED EMBODIMENTS

Figure 1:
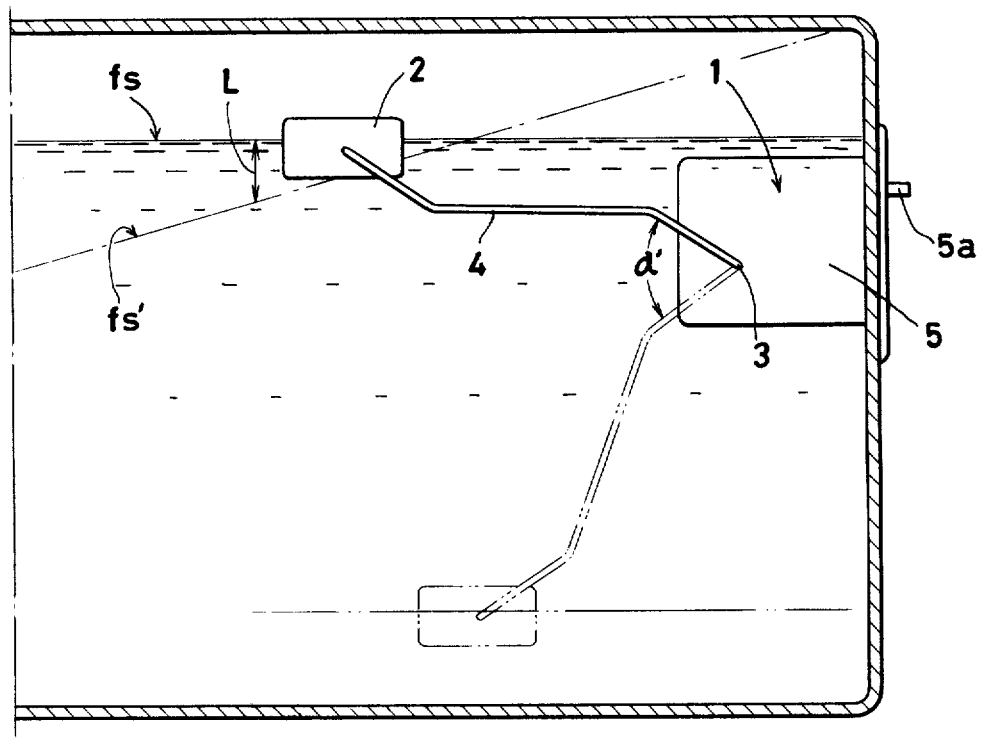
FIG. 1 is an explanatory diagram illustrating the function of a typical flaot-type liquid-level gauge known to the art.
Figure 2:
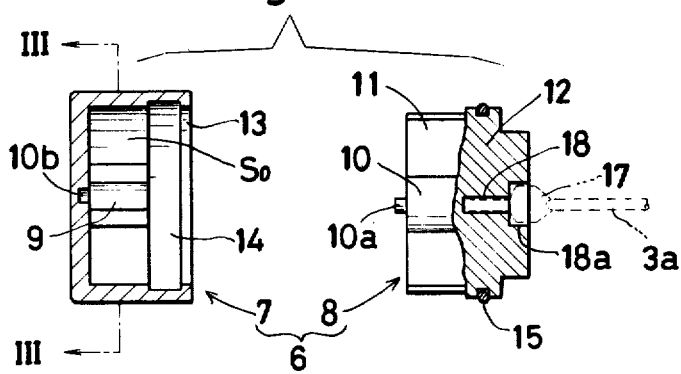
FIG. 2 is a partially cutaway sectioned view of the first embodiment of the device for braking in the liquid-level gauge according to the present invention.
Figure 3A:
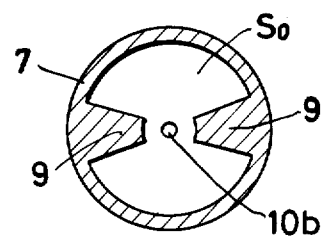
FIG. 3(A) is a sectioned view taken along the line III—III of the diagram of FIG. 2.
Figure 3B:
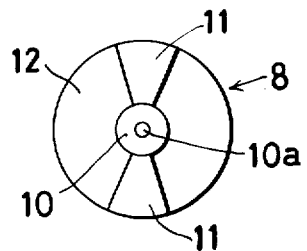
FIG. 3(B) is a plan view of the vane member serving as the second member in the embodiment of FIG. 2.
Figure 3C:
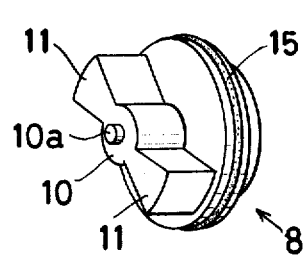
FIG. 3(C) is a perspective view of the vane member of FIG. 3(B).

The device for braking the motion of a float according to the present invention can be effectively used with any of the liquid-level gauges of a float-operated construction. Now, a typical float-type liquid-level gauge will be described in FIG. 1. A float-type liquid-level gauge 1 is provided with an arm 4 which has supported at one end thereof a float 2 kept on the liquid surface by buoyant force and has the other end thereof form a rotary shaft 3. This rotary shaft 3 is connected to the rotary shaft of a variable resistor (not shown) built in a housing 5 to serve the purpose of converting the position of the float into a corresponding electrical resistance. This variable resistor is interposed between a power source and the gauge indicator through a terminal 5a.

FIGS. 2 through 7 illustrate the first embodiment of the braking device 6 of the present invention to be used for controlling the motion of the float 2. The braking device 6 of the present embodiment comprises a casing 7 and a vane member 8 accommodated within the casing. The casing 7 possesses a cylindrical blind hole. This cylindrical blind hole has its interior space divided generally into two symmetrical fan-shaped chamber $S_o$ with a pair of projections 9 extended toward the axis of the cylindrical blind hole from the diametrically opposite portions of the peripheral wall of the hole. At the center of the bottom of the blind hole, there is formed a bearing aperture 10b. On the inner wall surface of the cylindrical blind hole close to the opening of the hole, there is formed a groove 14.

The vane member 8 comprises a disc-like cover 12 having a diameter substantially equal to the diameter of the cylindrical blind hole, a shaft member 10 provided at the center on one surface of the cover 12 and a pair of wing-shaped vanes 11 extended diametrically from the shaft member 10. The combined length of the wing-shaped vanes is slightly smaller than the inside diameter of the casing 7. The shaft member 10 is provided at the center thereof with a small projection 10a adapted to fit in the bearing hole 10b. On the outer peripheral surface of the cover 12 is provided a seal member 15 such as an O-ring.

Figure 4:
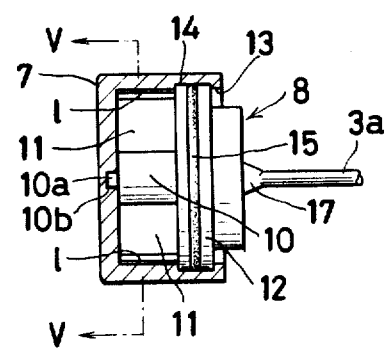
FIG. 4 is a sectioned view of the first embodiment in its assembled state.
Figure 5:
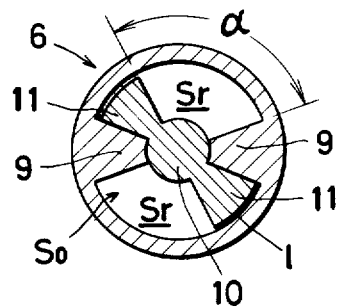
FIG. 5 is a sectioned view taken along the line V—V of the diagram of FIG. 4.

When the vane member 8 is inserted into the casing 7 through its opening 13, therefore, the small projection 10a formed on the shaft member 10 fits into the bearing hole 10b formed at the center of the bottom of the casing as illustrated in FIG. 4 and the wing-shaped vanes 11 are accommodated into the fan-shaped chambers $S_o$. When the cover 12 is set in position in the circular space enclosed with the groove 14, the seal member 15 provided along the periphery of the cover 12 comes into intimate contact with the groove 14 and tightly seals the interior of the casing 7. Consequently, the vane member 8 is permitted to make free rotation to the maximum angle of $\alpha$ (FIG. 5) relative to the casing.

When the vane member 8 is set in position inside the casing as described above, therefore, the fan-shaped chambers $S_o$ provide, in addition to the space physically occupied by the wing-shaped vanes 11, an extra space $S_r$ available for the aforementioned free rotation of the wing-shaped vanes 11 of the vane member 8. Because of this extra space $S_r$, the vane member 8 and the casing 7 are allowed to rotate freely relative to each other up to the maximum angle of $\alpha$.

This extra space $S_r$ is filled with a braking fluid possessed of a desired degree of viscosity such as, for example, grease or silicone oil. The filling of the extra space with the fluid is accomplished easily by having the fluid placed in the fan-shaped chambers $S_o$ prior to the insertion of the vane member 8 into the casing 7. Otherwise, an orifice may be perforated at a proper position through the wall of the casing 7 so that the fluid can be introduced into the fan-shaped chambers $S_o$ after the insertion of the vane member 8 into the casing 7. Upon completion of the introduction, the orifice is closed.

When an external force is applied to rotate the vane member after the extra space $S_r$ has been filled with the braking fluid as described above, the fluid is forced through the paths 1 formed between the wing-shaped vanes of the vane member and the inner wall surface of the casing and moved into a space formed anew inside the fan-shaped chambers. The fluid has a certain degree of viscosity and, as it flows through the relatively narrow paths l, it offers resistance and consequently produces a braking force of a magnitude which depends on the viscosity of the fluid, the cross section, length and shape of the paths l, etc. When either of the casing and the vane member is fixed in position and the other is connected with the portion adapted to rotate in conjunction with the float 2, with their axes of rotation in coincidence, the resistance which the fluid exerts functions as a braking force against any motion of the float produced at a velocity in excess of a prescribed level.

Figure 6:
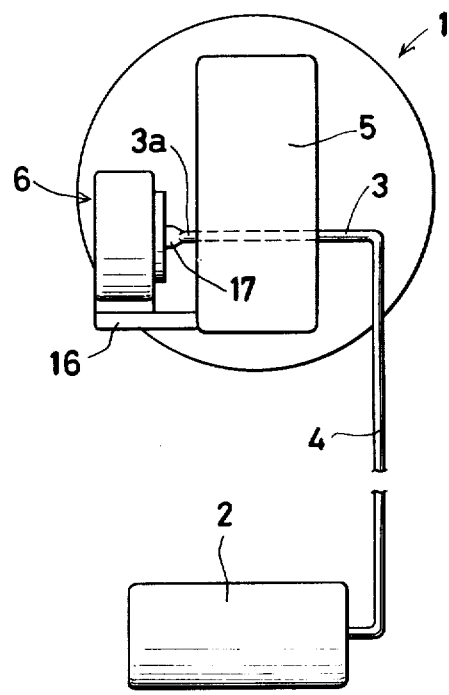
FIG. 6 is an explanatory diagram showing the braking device of the first embodiment in a state disposed in a liquid-level gauge.
Figure 7:
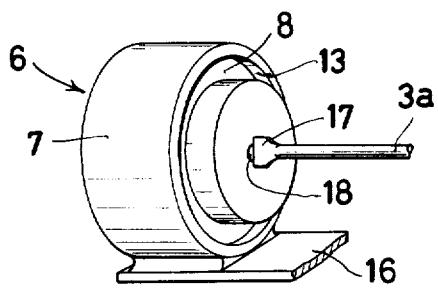
FIG. 7 is a perspective view of the braking device of FIG. 6.

To be more specific, the rotary shaft 3 of the float 2 shown in FIG. 1 passes through the housing 5 and extends out of the other side of the housing as illustrated in FIGS. 6 and 7. The vane member 8 is connected to the protruding end 3a of the rotary shaft 3, with their respective axes of rotation in coincidence.

In other words, the casing 7 is fastened to the housing 5 through the medium of the arm member 16 which protrudes from the housing as shown in FIGS. 6 and 7. The vane member 8 is provided with a receiving hole 18 adapted to admit the protruding end 3a of the rotary shaft along its axis when the casing is fastened to the housing. This receiving hole 18 is provided with a groove 18a adapted to fit round a chamfered portion 17 formed by crushing the protruding end 3a of the rotary shaft. Thus, the vane member is functionally connected with the protruding end 3a of the rotary shaft.

As a result, whenever the float 2 of the liquid-level gauge produces a sudden motion, the braking device applies a braking force through the medium of the rotary shaft 3 and the arm 4. Specifically, when the liquid level $f_s$ (FIG. 1) is displaced in the vertical direction, the float 2 tends to follow the vertical displacement of the liquid level. Since the rotary shaft 3 of the float is connected with the vane member of the braking device, there is exerted a braking force against a sudden displacement of the liquid level. This braking force is determined by the cross section, shape and length of the paths 1 for the braking fluid and the viscosity of the fluid. When the aforementioned conditions of the paths l for the fluid and the viscosity of the fluid are fixed, the braking force exerted on the float's motion is governed by the velocity at which the fluid passes through the paths l, namely the velocity of the vertical motion of the float and the velocity of the relative rotation between the vane member and the casing.

It follows that the braking force is relatively weak and the float's vertical motion occurs relatively easily when the dynamic velocity of the float or the vane member is low, whereas the braking force is quite strong enough to impede the float's motion when the float tends to produce a sudden motion.

This impeding activity is important. Now, this operation is considered from the practical point of view as depicted in FIG. 1. Generally, when the liquid level $f_s$ falls because of the consumption of fuel, for example, since the fall of the liquid level is relatively gradual, the vane member which moves in conjunction with the float is not subjected to any resistance. Consequently, the float follows the falling liquid level, enabling the detection of the amount of liquid to be carried out normally. When a sudden fluctuation is caused in the liquid level, the rapid positional change the float tends to produce in following the fluctuation is braked by a braking force applied to the vane member. Consequently, the float is prevented from following the fluctuation of the liquid level and caused to remain at the average liquid level which would exist if the liquid should keep a level surface. The result is that the output of the detection is stably maintained.

The braking force exerted as described above is also manifested when the liquid level produces a sudden, momentary displacement because of some external factor such as a sudden start, sudden acceleration, sudden curve made by the vehicle. When the liquid level $f_s$ is inclined to assume a new liquid level $f_s'$ as shown in FIG. 1 in consequence of acceleration, the float in the conventional liquid-level gauge immediately follows the displacement L of liquid level at the portion of the float so that a great change occurs in the output of detection in spite of the actual absence of change in the amount of liquid. In the case of the liquid-level gauge using the braking device of this invention, when such a sudden displacement L is produced in the liquid level, the braking force exerted on the motion of the float through the medium of the vane member 8 causes the float to move relatively gradually over a long duration in the direction of the portion of the liquid level which has produced the aforementioned displacement. At the instant at which the liquid level $f_s$ is inclined as illustrated in FIG. 1, the float continues to retain the position $f_s$ corresponding to the normal volume of liquid and, therefore, is suspended in the air at a distance equivalent to the displacement L relative to the inclined liquid level $f_s'$.

After the inclined liquid level has been retained for a relatively long duration, the float 2 begins to move in the direction of the inclined liquid level $f_s'$. Generally, however, the external factor which causes such an acceleration does not last very long. Before the float 2 has produced any appreciable positional displacement, therefore, the liquid level resumes its normal liquid level at which the float has so far been retained by the braking force. Consequently, the float 2 permits the liquid-level gauge to retain stable output.

The braking force described above can be set by selection of the aforementioned various parameters, viz. the viscosity of the fluid and the cross section, shape and length of the paths 1 which permit the occurrence of relative motion within the braking device. Thus, it can be adjusted as desired by selecting the fluid which befits the particular liquid-level gauge in use and selecting the various parameters accordingly.

In the embodiment so far described, the relative rotation produced within the braking device is limited to the maximum angle $\alpha$. This angle of rotation may be equal to the angle $\alpha'$ of rotation of the arm 4 or the rotary shaft 3 which is in conformity with the range of the maximum movement of the float as shown in FIG. 1. This is because in the braking device of the present invention, the projection 9 formed within the casing can be used as a stopper, whereas in the ordinary liquid-level gauge, the gauge is provided with a stopper adapted to limit the maximum range of the motion of the arm 4 for convenience of handling and for the purpose of preventing any excessive force from being exerted on the variable resistor.

The casing for the vane member of the braking device of this invention may be easily and inexpensively manufactured of a synthetic resin. Further, the amount of the braking liquid can be saved by an amount equalling the space occupied by the projection. Where there is no specific necessity for limiting the range of the motion of the float within the liquid-level gauge, no special use is found for the projection 9 other than for saving braking liquid.

In the embodiment given above, the vane member has been described as comprising a pair of wing-shaped vanes. The number and shape of such vanes are optional. The paths 1 for permitting the flow of the braking fluid may be formed by cutting annular grooves on the outer periphery of the vanes or on the inner wall of the casing or by making through holes in the vanes instead of leaving spaces between the vanes and the inner wall of the casing. Such grooves or through holes may be bent so as to offer increased resistance to the flow of the braking fluid therethrough. Further, the cover 12 which is intended to seal tightly the interior of the casing may be hermetically joined to the opening 13 of the casing, separately of the vane member 8. In such case, the water tightness of the cover 12 may be ensured by attaching a rubber bushing at the center of the cover where the shaft extends from the vane member and connects to the rotary shaft 3 of the float.

In the embodiment touched upon above, the member which is encircled by the casing is adapted to rotate in conjunction with the float. It is self-evident that the same effect of the braking device of this invention is brought forth when the casing is adapted to rotate in conjunction with the float.

Figure 8:
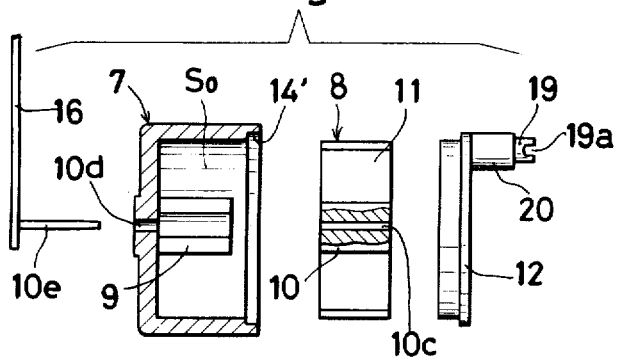
FIG. 8 is a partially cutaway sectioned view of the second preferred embodiment of the braking device according to the present invention.
Figure 9A:
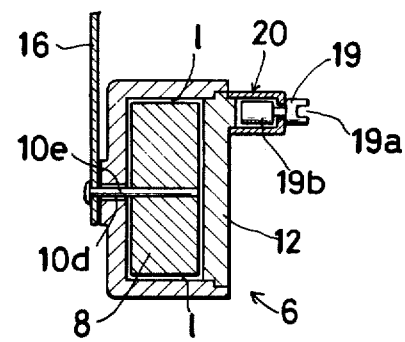
FIG. 9(A) is a longitudinally sectioned view of the second embodiment in an assembled state.
Figure 9B:
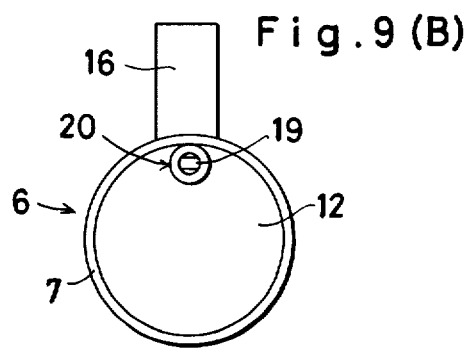
FIG. 9(B) is a front view of the second embodiment.

Now, the second embodiment of the braking device of this invention for use in the liquid-level gauge will be described with reference to FIGS. 8 through 10.

In the second embodiment, a vane member 8 comprises a shaft member 10 and vanes 11. A cover 12 is formed separately of the vane member and is used to close water-tightly the open end of the casing 7 by a known method. Thus, the present embodiment does not have the snap-in mechanism used in the first embodiment. The positioning of the cover 12, therefore, is facilitated by providing a stepped portion 14' in the open end of the casing.

Before the inner space $S_o$ of the casing is tightly sealed with the cover 12, the vane member 8 is set in position inside the inner space and the braking fluid is introduced to fill the remaining space. The shaft 10 of the vane member 8 is provided along the axis thereof with a through hole 10c. A pin 10e which is relatively loosely passed through a perforation formed at the center of the bottom of the casing from outside the casing is forcibly driven into the through hole 10c. Consequently, the pin 10e and the vane member 8 are connected with each other and the casing is now permitted to rotate freely relative to the pin and the vane member. The outer end of this pin 10e is fixed by a known method to the supporting member 16 serving to keep in position the whole of the braking device 6. Thus, the vane member is fixed additionally relative to the supporting member 16.

The extra space $S_r$ which occurs as described above inside the inner space $S_o$ of the casing after insertion therein of the vane member is filled with a braking fluid having a desired degree of viscosity and is also provided with paths 1 of a suitable shape to permit the flow of the braking fluid, though not illustrated in the drawing. Further, since the perforation 10d in the casing through which the pin 10e is pierced into the casing has a possibility of permitting undesirable escape of the braking fluid contained in the casing, the possible leakage is effectively precluded by having a seal member such as a rubber bushing disposed in the perforation 10d.

Figure 10:
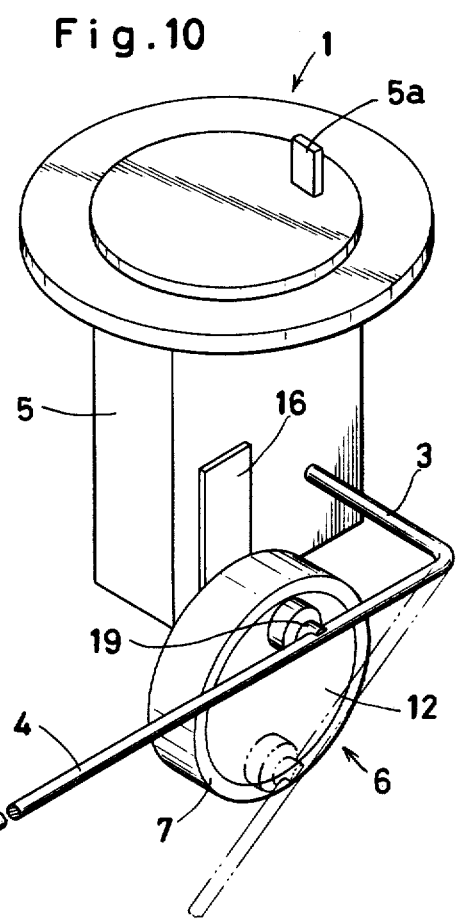
FIG. 10 is an explanatory view of the second embodiment of the braking device in a state disposed in a liquid-level gauge.

In order that the casing 7 may be allowed to make a rotation in harmony with the motion of the float of the liquid-level gauge relative to the vane member 8 which is substantially fastened to the supporting member 16, the open end side of the casing, namely the periphery of the cover 10 in the present embodiment, is provided with an engaging member 19 adapted to catch firm hold of the arm 4 for keeping the float 2 in position as illustrated in FIG. 10. This engaging member 19, as illustrated in FIG. 9(A), comprises a chuck member 19a of the shape of a horse's hoof serving to hold fast in position the arm 4, a hollow bearing member 20 secured to the cover and adapted to support rotatably the chuck member 19a, and a supporting member 19b extended from inside the bearing member 20 and connected unextractably with the chuck member 19. Thus, the float's arm 4 is allowed to make an arcuate motion with the rotary shaft 3 as the fulcrum and the engaging member 19 does not interfere with the arcuate motion of the arm 4 because this engaging member 19 has the arm rotatably supported thereon.

The mechanism that the circular member (casing) is rotated by the arcuate motion of the arm 4 capable of retaining its linear shape intact at all times admits various modifications resorting to combinations of proper linkages. Thus, it may be replaced by a modification using an ideal combination of linkages to suit best the particular occasion. The supporting member 16 which serves to keep the whole of the braking device in position may advantageously be fastened by welding or some other suitable method to one side of the housing 5 for the liquid-level gauge at a position where the engaging member 19 is allowed to remain in effective contact with the float's arm 4 and fulfil its function to an ample extent as illustrated in FIG. 10.

While the second embodiment described above has the same function and effect as the first embodiment, it has the advantage that the attachment thereof to the liquid-level gauge is accomplished simply by uniting the engaging member 19 with the float's arm 4 and fastening the supporting member 16 to the housing without necessitating any modification to the liquid-level gauge itself. In the case of a liquid-level gauge which has been specifically designed in anticipation of subsequent combination thereof with the braking device of this invention, the supporting member 16 may be molded in advance as an integral part of the housing 5 or the pin 10e extended from the vane member may be directly fastened to the housing.

The liquid-level gauge 1 illustrated in FIG. 10 happens to be of a type designed to be hung from the ceiling plate of the fuel tank. It is self-evident, however, that the braking device of the present invention can be effectively operated with a horizontal type liquid-level gauge similar to the liquid-level gauge illustrated in FIG. 1.

The two embodiments of the braking device of the present invention so far described are both of rotary type. Being thus rotary in mode of operation, the braking device has the advantage that the device itself can be constructed compactly, installed as close to the liquid-level gauge as possible and handled with great ease.

Figure 12:
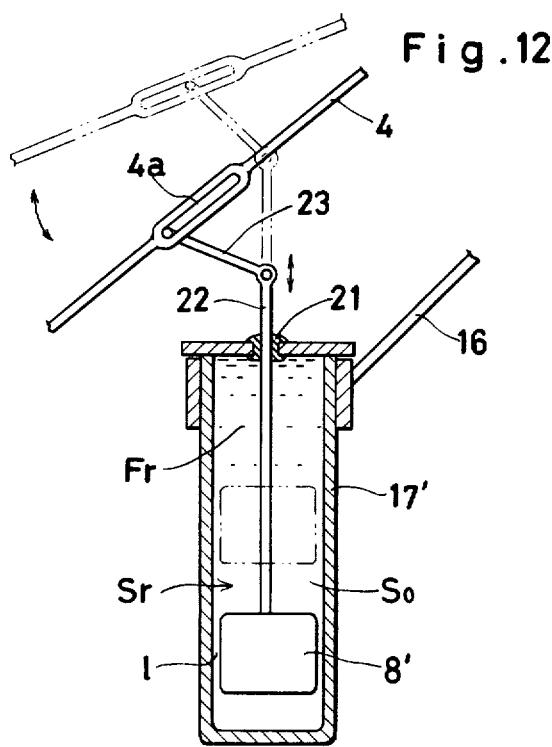
FIG. 12 is a sectioned view of the braking device of FIG. 11.
Figure 11:
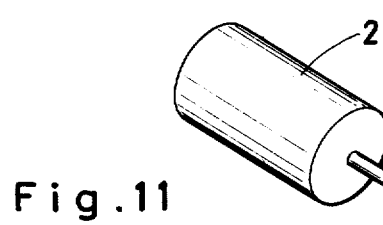
FIG. 11 is an explanatory diagram of the third embodiment of the braking device of this invention in a state disposed in a liquid-level gauge.

Now, another embodiment of this invention, namely a linear-motion type braking device, will be described with reference to FIGS. 11 and 12. In the present embodiment, the casing is in the form of a cylinder and the vane member 8' in the form of a piston. The cylinder 7' is secured by means of a fixing member 16 to the housing 5 of the liquid-level gauge. The piston 8' accommodated within the inner space $S_o$ of the cylinder 7' is possessed of a shaft 22 extended out of the cylinder 7' through a seal member 21 such as a rubber bushing disposed in the ceiling plate of the cylinder 7'. To the free end of the shaft 22 is pivotally connected one end of a second shaft 23. Within an elongate hole 4a formed in the arm 4 carrying thereon the float 2, the other end of the second shaft 23 is inserted in such a manner as to enjoy the freedom of rotation needed in fulfilling the part of a fulcrum and freedom of some sliding motion in the direction parallel to the arm 4.

When the arm 4 produces an overall arcuate motion by following the vertical displacement of the liquid level, the first and second shafts 22, 23 cooperate as one form of linkage to convert the arcuate motion of the arm 4 into a linear motion and consequently cause the piston 8' to produce a corresponding linear motion. Similarly to the embodiments described above, the inner space of the cylinder 7' is filled with a fluid Fr possessed of a prescribed degree of viscosity. As the float 2 is caused to produce a vertical motion and the piston 8' is consequently moved in the vertical direction inside the cylinder 7', the fluid is forced to find its way through the path 1 formed for the flow of the fluid between the outer surface of the piston 8' and the inner surface of the cylinder 7'. When the velocity of the vertical motion of the float 2 exceeds the capacity of the braking motion produced by the braking device, the vertical motion of the float 2 is automatically curbed by the braking force in much the same way as in the preceding embodiments.

As the linkage which permits effective cooperation of the piston 8' and the float 2, the present embodiment has been described as resorting to what relies upon the combination of two shafts 22, 23. This linkage may be replaced by some other suitable form of linkage. For example, the cylinder 7' may be disposed parallelly to the housing 5 so that the vertical motion of the float 2 will be directly converted into a horizontal motion of the piston 8'. In the case of the type of a liquid-level gauge adapted to make use of the linear motion of the float, the shaft of the piston 8' may be connected directly with the shaft of the float 2. As concerns the stopper which serves the purpose of limiting the maximum range of the motion of the float 2, no special use is found for the stopper when the axial length of the interior of the cylinder 7' is suitably fixed. The fact that the motion of the piston 8' is limited by the bottom and ceiling of the cylinder 7' automatically fulfills the function of the stopper.

It is clear from the embodiments described above that the device of this invention for braking the motion of a float in the float type liquid-level gauge comprises the first member and the second member, the first member possessing a tightly closed chamber large enough to contain therein the second member and further retain an extra space, either of the first and second members being fixed in position without reference to the motion of the float of the liquid-level gauge and the other member being connected through the medium of connecting means to the part adapted to move in conjunction with the float, and the chamber of the first member being filled with a fluid and provided with a path for permitting controlled flow of the fluid when there is produced a relative motion between the first and second members. The first member is in the shape of a disc in the first and second embodiments and in the shape of a cylinder in the third embodiment, whereas the second member may be in the shape of vanes or a piston. Consequently, the relative motion which is produced between the first and second members in consequence of the motion of the float 2 through the medium of linkage means such as the engaging groove 18a, the freely rotatable engaging member 19, the linkage 22, 23, etc. may be converted into a rotary motion or linear motion, whichever best fits the occasion.

The linkage means may be of a type utilizing magnetic force instead of mechanical force. A typical example of linkage means which makes use of magnetic force in the rotary braking device according to the present invention is illustrated in FIG. 13.

Figure 13:
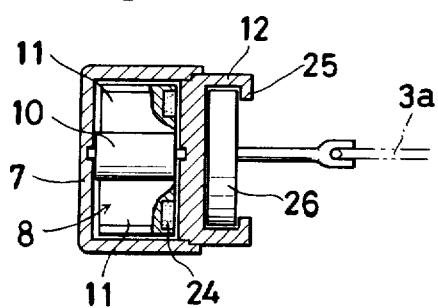
FIG. 13 is a sectioned view of the fourth embodiment of the braking device according to the present invention.

With reference to FIG. 13, the casing 7 is provided in the inner space thereof with the vane member 8 rotatably pivoted therein, filled with a fluid and then tightly closed with the cover 12. Permanent magnets 24 are buried in the end portions of the vanes 11 of the vane member 8 confronting the reverse surface of the cover 12. On the other hand, on the obverse side of the cover 12, a magnet 26 is rotatably contained in a disc-shaped container 25. When the casing 7 is fixed in position by a suitable means (not shown) and the magnet 26 is connected to a rotary shaft 3a adapted to rotate in conjunction with the float 2, a rotation of this magnet 26 magnetically causes the vane member to rotate accordingly inside the casing. Consequently, the braking force which is exerted upon the vane member can be utilized for applying a braking force to the float by virtue of magnetism. When the casing has a construction as described above, possible leakage of the fluid contained inside the casing can be completely prevented.

The braking force exerted upon the float 2 can be fixed at a desired level by suitably selecting the various parameters as described above. Besides, the magnitude of the braking force exerted on the float in the upward direction can be varied from that in the downward direction by having a one-way restrictor valve disposed in the path 1 itself or in the through hole perforated such as in the vane member or piston substantially parallelly to the path 1, so that the weight of the float acting constantly in the direction which counteracts the braking force during downward motion of the float may be compensated for by the added resistance which is produced by this one-way restrictor valve. Since any of the one-way restrictor valves which are generally adopted in this type of fluid operation can be used effectively for this purpose, there is no particular need for citing concrete examples.

As observed regarding the component parts used in the first and second embodiments described above, either of the first and second members may be selected for connection with the part adapted to move in conjunction with the float. Even in the case of the third embodiment, the cylinder 7' may be used as a movable member instead of the piston 8'. In contrast, the member which is fixed in position without reference to the motion of the float 2 may be fastened to the housing of the liquid-level gauge or to the fuel tank which is not shown in the diagram.

Further, where the braking device has a rotary construction, a reduction gear may be interposed between the rotary shaft 3 of the float 2 and the braking device for the purpose of notably increasing the braking force which is produced by the braking device.

As described in detail above, the braking device of the present invention can easily be incorporated into any existing float-type liquid-level gauge without requiring any modification to the fundamental construction of the liquid-level gauge. It is highly effective in stabilizing the output of the liquid-level gauge in spite of various displacements of the liquid level such as vertical fluctuation and general inclination. The braking device further enjoys great simplicity of construction and its component members can be produced easily be molding of a plastic material. Thus, low cost and high practical utility form characteristic features of the braking device of this invention.

What is claimed is:

1. A device for braking the motion of a float in a float type liquid-level gauge used with a liquid container and adapted so that, by virture of the float kept on the liquid surface in the container by buoyant force and allowed to follow faithfully the vertical displacement of liquid level by the force of gravity acting thereon, the volume of the liquid in the container measured in terms of the height of the liquid level determinable by the position of the float relative to the container is indicated on the scale of the gauge, which device comprises:

a first member possessed of an inner chamber, a second member accommodated within the inner chamber of the first member in such a manner as to produce a motion relative to the first member, the size of the second member being such that the inner chamber of the first member is large enough to accommodate the second member and also retain an extra space for permitting the motion of the second member relative to the first member.

a fluid placed to fill the extra space within the inner chamber of the first member, a cover member serving to seal tightly the inner chamber containing therein the second member and the fluid, a path for permitting the flow of the fluid within the tightly sealed inner chamber when there is produced a relative motion between the first and second members mentioned above, means for fixing in position either one of the first and second members, and means for connecting the other one of the first and second members with the part adapted to move in conjunction with the float, said first member possesses a disc-like inner chamber and said second member being provided with vanes adapted to rotate around the axis thereof within the inner chamber, whereby the relative motion to be produced between the first and second members is a rotary motion.

2. The braking device according to claim 1, wherein the first member is fixed in position and the second member is connected with an arm capable of rotating in conjunction with the motion of the float.

3. The braking device according to claim 1, wherein the second member is fixed in position and the first member is further provided on the periphery thereof with a rotatable connecting means adapted to keep firm hold of the arm supporting the float.

4. The braking device according to claim 1, wherein the path for the flow of the fluid is an opening between the first and second members.

* * * * *